US010591648B2

(12) United States Patent
Ramones et al.

(10) Patent No.: US 10,591,648 B2
(45) Date of Patent: Mar. 17, 2020

(54) CAMERA WITH POLYGONAL LENS

(71) Applicant: Netgear, Inc., San Jose, CA (US)

(72) Inventors: John Kui Yin Ramones, San Ramon, CA (US); Henry Arthur Jupille, Montrose, CO (US)

(73) Assignee: Arlo Technologies, Inc., Carlsbad, CA (US)

( * ) Notice: Subject to any disclaimer, the term of this patent is extended or adjusted under 35 U.S.C. 154(b) by 354 days.

(21) Appl. No.: 15/169,905

(22) Filed: Jun. 1, 2016

(65) Prior Publication Data

US 2017/0353656 A1 Dec. 7, 2017

(51) Int. Cl.
*G02B 3/02* (2006.01)
*H04N 5/225* (2006.01)
*H04N 5/33* (2006.01)

(52) U.S. Cl.
CPC .............. *G02B 3/02* (2013.01); *H04N 5/2256* (2013.01); *H04N 5/33* (2013.01)

(58) Field of Classification Search
CPC .............. H04N 5/23238; H04N 5/2256; H04N 5/2254; H04N 5/33; G02B 3/02
See application file for complete search history.

(56) References Cited

U.S. PATENT DOCUMENTS

| 6,812,970 | B1 | 11/2004 | McBride |
| 7,614,563 | B1* | 11/2009 | Nunnink ............ G06K 7/10732 235/462.42 |
| 7,909,521 | B2 | 3/2011 | Son |
| 8,066,392 | B2 | 11/2011 | Wang |
| 8,337,100 | B2 | 12/2012 | Jung et al. |
| 8,363,157 | B1* | 1/2013 | Han ..................... H04N 5/2256 348/370 |
| 8,807,813 | B2* | 8/2014 | Hill ..................... G01N 21/8806 362/244 |
| 9,071,740 | B1 | 6/2015 | Duffy et al. |
| 9,142,214 | B2 | 9/2015 | Scalisi |
| 9,228,731 | B2 | 1/2016 | Chen |
| 2003/0019931 | A1* | 1/2003 | Tsikos .................... G02B 26/10 235/454 |
| 2006/0028811 | A1 | 2/2006 | Ross, Jr. et al. |
| 2006/0076478 | A1* | 4/2006 | Johnson ................ B60S 1/0822 250/227.25 |
| 2007/0222888 | A1 | 9/2007 | Xiao et al. |
| 2008/0055897 | A1* | 3/2008 | Yoshida ............... G02B 6/0068 362/231 |
| 2008/0165322 | A1* | 7/2008 | Su .......................... A61B 3/12 351/211 |
| 2011/0117959 | A1* | 5/2011 | Rolston ..................... A46B 7/04 455/556.1 |
| 2012/0160260 | A1* | 6/2012 | Rolston .................. A45D 33/32 132/288 |

(Continued)

*Primary Examiner* — Neil R Mikeska
(74) *Attorney, Agent, or Firm* — Boyle Fredrickson S.C.

(57) ABSTRACT

A camera and/or a method of manufacturing said camera configured for receiving a widescreen format image from an LED array camera having a reduced form factor. The camera has a generally circular LED array located around an image sensor and a generally polygonal lens covering the generally circular LED array. The outer edge of the generally polygonal lens has a length equal to or less than the outer diameter of the generally circular LED array.

20 Claims, 6 Drawing Sheets

(56) References Cited

U.S. PATENT DOCUMENTS

| | | | | |
|---|---|---|---|---|
| 2013/0003342 A1* | 1/2013 | You | ............ | G03B 15/05 362/17 |
| 2013/0169814 A1 | 7/2013 | Liu | | |
| 2014/0211446 A1* | 7/2014 | Tenmyo | ............ | G03B 15/05 362/11 |
| 2014/0375951 A1* | 12/2014 | Barth | ............ | A61B 3/1005 351/206 |

\* cited by examiner

CAMERA WITH POLYGONAL LENS

BACKGROUND OF THE INVENTION

1. Field of the Invention

The invention relates generally to a camera, and more particularly, relates to a camera that projects an uncropped LED light cone around an image sensor. The invention additionally relates to a method of using the same.

2. Discussion of the Related Art

As the market for small electronic devices has continued to expand, the availability and accessibility of cameras has similarly experienced growth. The camera industry has experienced significant expansion as a result of the improvement of digital photography, and the introduction of high quality digital image sensors into a growing field of small electronic devices, such as mobile phones, webcams, wireless network compatible cameras, handheld camcorders, action cameras, etc. These various cameras have become increasingly commonplace, largely driven by their flexibility and general ease of use. For example, wireless network compatible cameras often are used for home security, business security, child monitoring, pet monitoring, etc. Additionally, many of these cameras offer beneficial features such as night vision through the use of infrared LEDs, high definition widescreen video, digital zoom, motion detection, audio alerts, etc.

However, many users of these and other cameras prefer the camera to be relatively discrete and unobtrusive despite demand for increased camera functionality. Thus, there is need and desire to make a camera with an infrared LED array in a compact form factor.

Typical infrared LED equipped cameras position individual LEDs in a forward-facing orientation around a centrally-located image sensor. This arraignment allows for the area surrounding the image sensors to be illuminated with infrared (IR) wavelength energy, which can then be detected by the centrally-located image sensor to facilitate night vision viewing. In this configuration, each of the LEDs emits an individual light cone of IR energy through an overlying lens. The overlying lens is typically circular as to match and fully cover the underlying circular LED array. When these individual light cones are combined, the cumulative IR energy emitted is sufficient to generally illuminate the camera's field of view. However, to prevent the lateral or outermost edges of these light cones from being undesirably cropped, which would result in a reduced field of view illumination by IR energy, the overlying circular lens often extends well beyond the individual LEDs located on the camera. As a result of this relatively large overlying circular lens, the form factor of the camera, i.e., the physical size and shape of the camera housing, is often larger than desired.

In light of the foregoing, a camera that exhibits a widescreen format night vision images with a reduced form factor, is desired.

Also, a camera that prevents cropping of laterally located LED emitted light cones is desired.

Also a method of using an LED array camera with a reduced form factor that creates a widescreen format night vision image is desired.

SUMMARY OF THE INVENTION

One or more of the above-identified needs are met by a camera including an annular LED array comprising a plurality of LEDs disposed about an image sensor, the annular LED array having an outer diameter, and a generally polygonal lens covering the annular LED array. An outer edge of the generally polygonal lens may have a length equal to or less than the outer diameter of the annular LED array.

In one embodiment, the generally equilateral polygonal lens is a generally square lens.

In one embodiment, the generally square lens further comprises at least a first vertex and a second vertex, wherein the first vertex of the generally square lens is disposed adjacent a first LED of the annular LED array, and a second vertex of the generally square lens is disposed adjacent a second LED of the annular LED array, which is diametrically opposed to the first LED.

In one embodiment, the first and second LEDs project uncropped light cones through the generally square lens.

In one embodiment, the outer edge of the generally polygonal lens is a first outer edge of a plurality of outer edges, and the plurality of outer edges are of equal length.

In one embodiment, the plurality of outer edges of equal length of the generally polygonal lens form a plurality of vertices of equal angle.

In accordance with another aspect of the invention a method of using an LED array camera is provided that results in the production of a camera configured to receive widescreen format images. The method includes providing a camera having an annular LED array positioned around an image sensor, where the annular LED array has an outer diameter, and a generally polygonal lens covering the annular LED array, where an outer edge of the generally polygonal lens has a length equal to or less than the outer diameter of the annular LED array. The method further entails projecting uncropped light cones from the plurality of LEDs through the generally polygonal lens in order to illuminate the field of view of the image sensor, and receiving an illuminated image at the image sensor in a widescreen format In one embodiment, a surface area of the generally equilateral polygonal lens may extending laterally beyond the right and left lateral edges of the generally circular LED array respectively as to project uncropped LED light cones through generally equilateral polygonal lens adjacent the first and second vertices.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of cameras could be constructed in accordance with the invention as defined by the claims. Hence, while the preferred embodiments of the invention will now be described with reference to a camera for use with a wireless network, it should be understood that the invention is in no way so limited.

Figure 1:
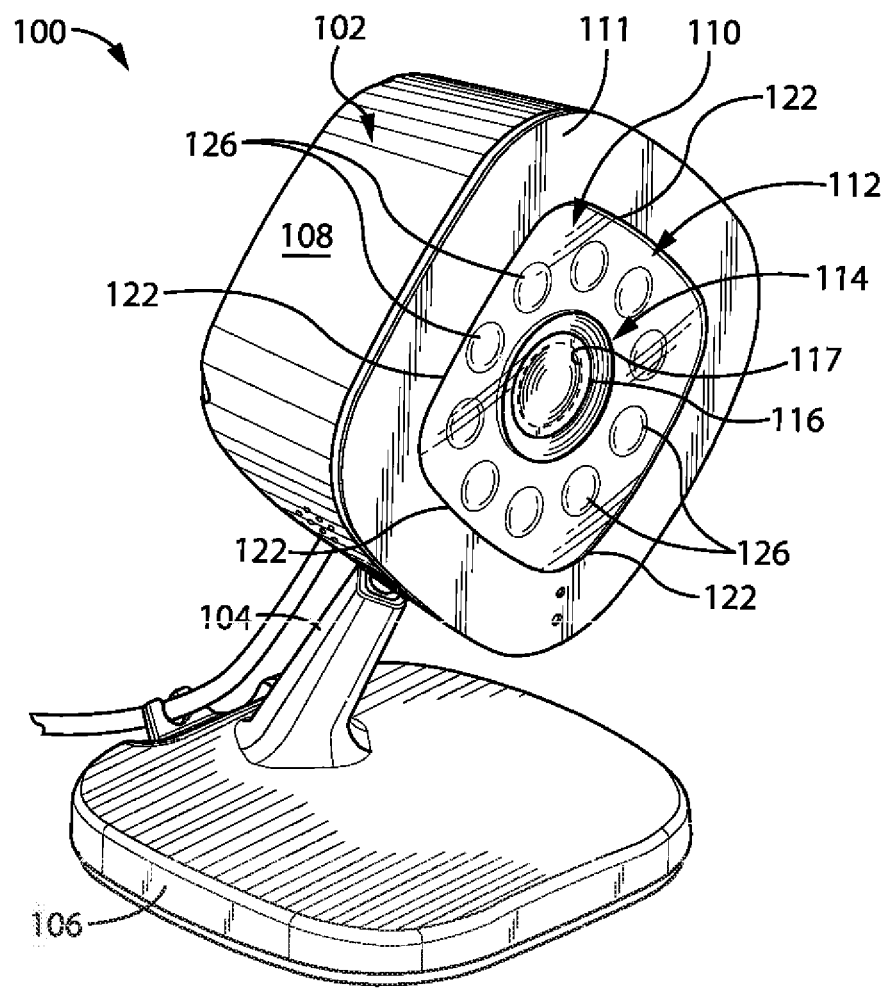
FIG. 1 is a front isometric view of a camera constructed in accordance with one embodiment of the present invention, including a generally polygonal lens covering an LED array.

FIG. 1 is an isometric view of a camera 100 constructed in accordance with one embodiment of the present invention. The camera 100 may be a wireless network connected camera, but it is in no way limited to such an environment. The camera 100 includes a body 102, a support arm 104 extending from the body 102, and a base 106 receiving the support arm 104. The body 102 of camera 100 includes an outer housing 108 having a front surface 111. As shown in FIG. 1, a generally polygonal lens 110 is disposed in the front surface 111 of the housing 108 and is configured to cover an LED array 112 positioned inwardly relative to the lens 110. The lens 110 may be include a generally centrally located aperture 114 configured to allow a camera lens 116, located over an IR sensitive image sensor 117, to extend through the aperture 114. In an alternative embodiment (not shown), the camera lens 116 may be integrated into the generally polygonal lens, such that the generally polygonal lens is uninterrupted and contains no aperture.

Figure 2:
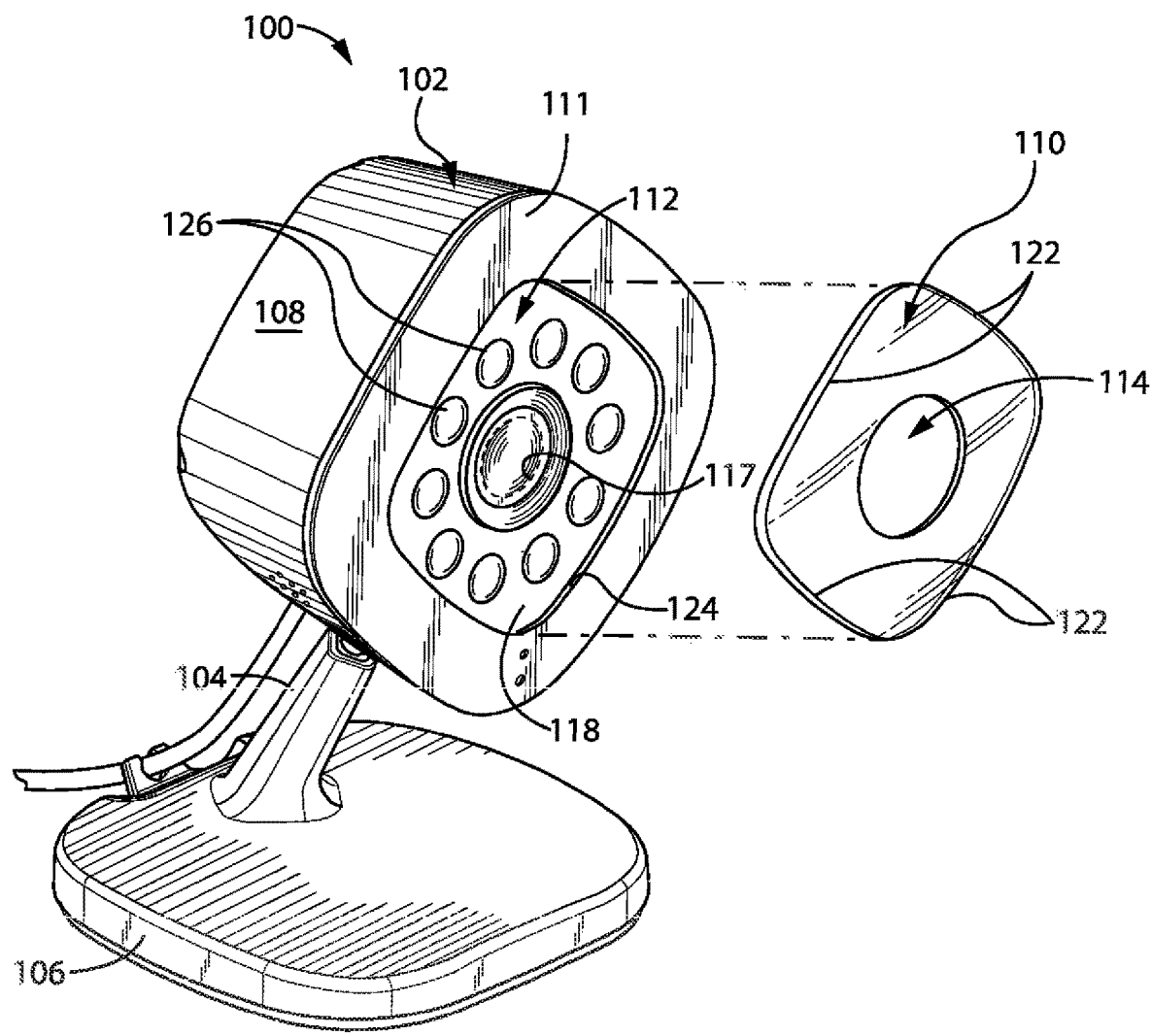
FIG. 2 is a partial exploded front isometric view of the camera of FIG. 1, showing the generally polygonal lens removed from the camera to reveal the LED array and a camera image sensor.

Referring to FIG. 2, the generally polygonal lens 110 may be received within a recess 118 located in the front surface 111 of the housing 108. In such an embodiment, outer edges 122 of the generally polygonal lens 110 may engage edges 124 of the recess 114, such that the lens 110 is flush mounted within the recess 114, relative to the front surface 111 of the housing 108, as is shown best in FIG. 2.

Returning now to FIG. 1, the lens 110 may be generally polygonal in that it is formed of straight or generally straight edges 122. As used herein the term "generally polygonal" shall be considered to include shapes having straight outer edges as well as shapes having outer edges that exhibit a slight curve and/or vertices along part or all of their length. It also shall be considered to have shapes that have either angled or curved corners. In some embodiments of the present invention, the lens 110 may be a general equilateral polygon lens, and in the illustrated embodiment, the lens 110 is a square or generally square lens. However other generally polygonal shapes are also considered within the scope of this invention. Such shapes include, but are not limited to, rectangles, pentagons, hexagons, heptagons, etc.

The lens 110 may be formed of a material that is well suited for use in manufacturing an optical lens and configured to allow IR energy to travel through the lens 110. Suitable lens materials include, but are not limited to, glass, high-index plastic, polycarbonate, quartz, and acrylic.

Referring now to FIGS. 1 and 2, the lens 110 is of a size and configuration as to cover the LED array 112, which is positioned inwardly relative to the lens 110, i.e., underneath or behind the lens 110. As shown, the LED array 112 comprises a plurality of individual light emitting diodes 126 (LEDs). Such LEDs are configured to emit IR energy in the range of 700 nm to 1 mm, in the form of light cones, which will be described in further detail below. However, LEDs of alternative wavelength emission are considered well within the scope of this invention. The LEDs 126 within the array 112 are positioned in an annular, possibly at least generally circular configuration about the camera lens 116. The LEDs 126 within the array 112 are positioned at least generally forward facing, such that the IR light cones emitted from the LEDs 126 illuminate the field of view of the camera 100, as will be described in further detail below. However, the LEDs 126 may be positioned at an angle ALPHA of between 0° and 45° relative to a longitudinal axis of the field of view of the image sensor 117; and, more typically between 0° and 30° relative to the longitudinal axis of the field of view of the image sensor 117. Such a configuration and orientation allow the individual LEDs 126 to each emit IR energy in an outwardly-extending light cone which, when combined, will generally illuminate the field of view of the camera 100.

In one embodiment, the field of view of the camera 100 is a widescreen format field of view. That is to say that the aspect ratio of the image generated by the camera 100 has a width to height ratio of approximately between 1.5:1 and 2.39:1; and, more typically approximately between 5:3 and 2.39:1. Accordingly, the individual LEDs 126 within the array 112 are in a generally configuration and orientated as to illuminate a sufficient field of view of the image sensor 117 necessary to generate an image having the above referenced widescreen aspect ratio. However, the LED array 112 is in no means limited to such an embodiment, and other configurations and orientations of LEDs 126 and LED arrays 112 are considered well within the scope of the present invention.

Figure 3:
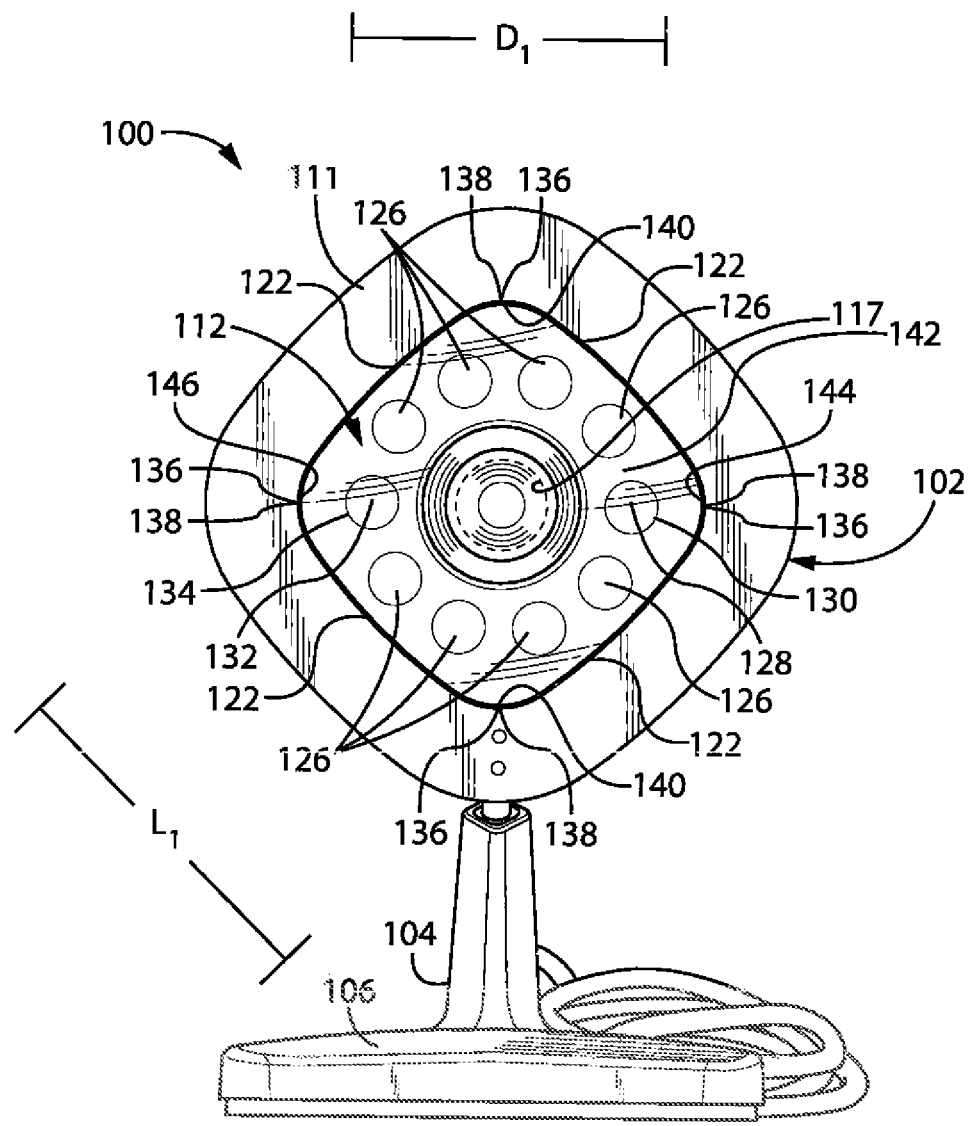
FIG. 3 is a front elevation view of the camera of FIG. 1.

Referring now to FIG. 3, in the illustrated embodiment of the present invention, the LED array 112 as shown includes ten individual LEDs 126 disposed equidistantly from one another about the camera lens 116 in an annular configuration, and more specifically a generally circular configuration in this specific embodiment. The generally circular LED array 112 has an outer diameter $D_1$ that extends from the outer edge of a first one 128 of the LEDs 126 to the outer edge of a second, diametrically opposing LED 132. $D_1$ may be approximately 40 millimeters to 41 millimeters; and, more preferably approximately 45 millimeters to 46 millimeters. In another embodiment of the present invention in which the configuration of the LEDs 126 is annular but not circular, such as an elliptical configuration, the outer diameter $D_1$ that extends from the outer edge of one LED 126 to the outer edge of an opposing LED 126 will be measured at the widest distance of the LED array 112. For example, in a configuration in which the annular configuration of the LEDs 126 is elliptical, distance $D_1$ may extend from the outer lateral edges of first and second LEDs positioned at opposite ends of the major axis of the ellipse defining the outer circumference of the array.

As was discussed above, the camera 100 of the present embodiment is configured to generate an image having a width greater than its height, and preferably a width to height ratio of approximately between 1.5:1 and 2.39:1. In this particular embodiment, the IR illuminated field of view of the camera 100 is desired have a sufficient width as to allow the image sensor 117 to generate the desired widescreen image. That is to say, if the LED array 112 insufficiently illuminated the lateral edges of the field of view of the camera 100 with IR energy, then the image sensor 117 would not be capable of generating a wide screen image during night vision viewing.

Still referring to FIG. 3, the lens 110 of the camera 100 is disposed over the LED array 112, and configured to optically disperse the IR energy emitted as IR light cones from the LEDs 126 in a manner such that the image sensor 117 may generate the widescreen image from the IR illuminated field of view of the camera 100. As was previously discussed, the lens is a generally equilateral polygonal lens, and more specifically is a generally square lens. The generally square lens 110 is defined by four equal length edges 122. Each of the edges 122 of the generally square lens 110 extends from a first end 136 to a second end 138 and has a length $L_1$ defined by the distance between the first end 136 and the second end 138. As shown in FIG. 3, the lens 110 has a plurality of vertices 140, wherein each vertex 140 is formed by the intersection of the first end 136 of one edge 122 and the second end 138 of an adjacent edge 122 of the lens 110. As was previously described, the vertices 140, or corners, of the generally polygonal lens 110 may be angled or curved. Furthermore, while in above described embodiment of the present invention, each of the vertices 140 is described as being of equal angle and each edge 122 is of equal length, it should be understood that the present invention is in no way limited to such an embodiment, and that combinations of various vertex 140 angles and edge 112 lengths are considered well within the scope of this invention.

In one preferred embodiment of the present invention, the surface area 142 of the lens 110 is reduced by result of having a length $L_1$ of the outer edge 122 of the lens 110 that is equal to or less than the outer diameter $D_1$ of the LED array 112. In one embodiment of the present invention, the length of $L_1$ may be approximately 40 millimeters to 41 millimeters; and, more preferably approximately 43 millimeters to 44 millimeters. In the camera 100 of the present invention, where the lens 110 has an edge 122 of a length $L_1$ that is equal to or less than the outer diameter $D_1$ of the underlying LED array 112, there exists potential that the lens 110 may undesirably truncate or crop the IR energy light cones emitted from the LEDs 126. Such an undesirable cropping of the IR energy light cones may inhibit the camera's ability to illuminate a sufficiently large field of view of the image sensor 117 as would allow the image sensor 117 to generate a widescreen night vision image. Rather than increase the length $L_1$ and surface area 142 of the lens 110, the inventors of the present invention have resolved this potential for undesirable cropping of the IR energy light cones emitted from the LEDs 126 through the specific orientation of the generally polygonal lens 110 relative to underlying generally circular LED array 112.

That is to say, still referring to FIG. 3, a first vertex 144 within the plurality of vertices 140 of the lens 110 is positioned adjacent to the outer edge of the first LED 128 located at the right lateral edge 130 of the generally circular LED array 112. Similarly, an opposing second vertex 146 within the plurality of vertices 140 of the lens is positioned adjacent to the outer edge of a second LED 132 located at the left lateral edge 134 of the generally circular LED array 112. In this general configuration, the first vertex 144 and second vertex 146 of the lens 110 extend slightly beyond the right lateral edge 130 and left lateral edge 134 of the generally circularly LED array 112, respectively. As will be described further below in reference to FIGS. 4A-5B, such a configuration allows an uncropped IR light cone to be emitted from the first and second LEDs 128, 130 through the generally polygonal lens 110, thereby providing the image sensor 117 of the camera 100 with a sufficiently large IR illuminated field of view as to generate a widescreen night vision image.

Figure 4A:
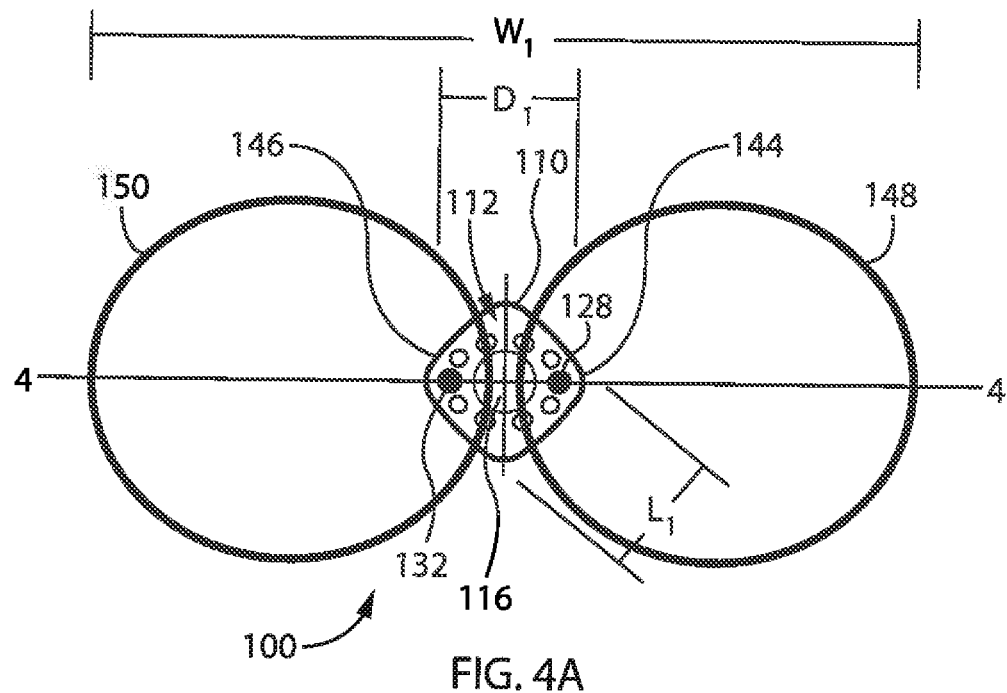
FIG. 4A is a partial front elevation view of the camera of FIG. 1, showing the cross sectional area of the light cones emitted from the lateral LEDs of the LED array.
Figure 4B:
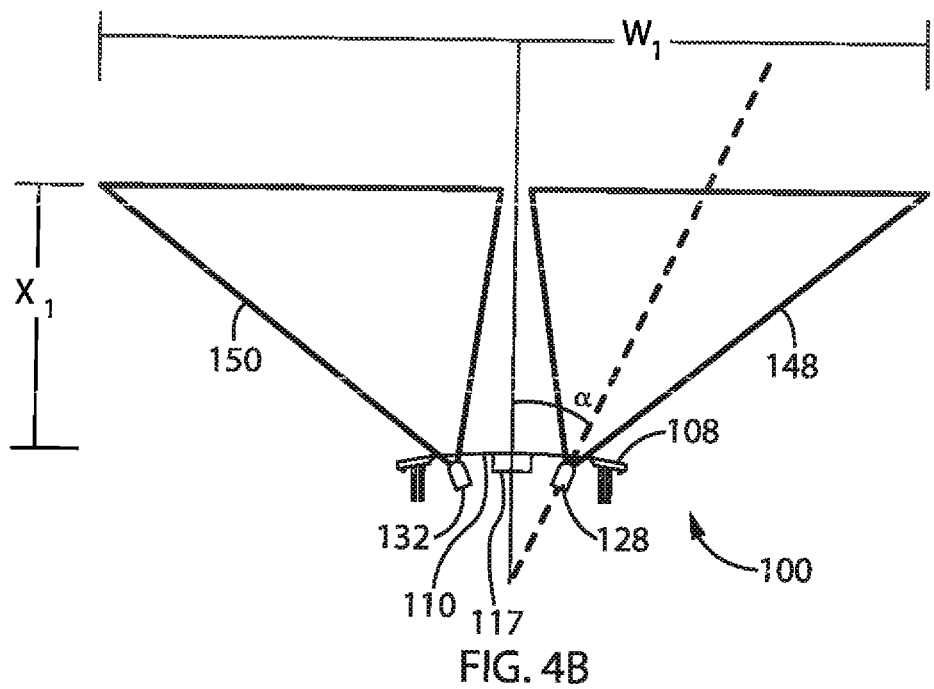
FIG. 4B is a partial cross-sectional view of the camera shown in FIG. 4A taken generally along line 4-4.

Referring now to FIGS. 4A and 4B, a simplified partial front and top cross-section view of the camera 100 including the generally polygonal lens 110 in accordance with one embodiment of the present invention are shown, respectively. Turning initially to FIG. 4A, the LED array 112 is shown underneath the generally polygonal lens 110 with the centrally located camera lens 116 extending through the aperture 114 in the generally polygonal lens 110. A first representative LED 128, located at the right lateral edge 130 of the generally circular LED array 112, is shown emitting an IR light cone 148. The IR light cone 148 is uncropped, i.e., not truncated, as would otherwise result from passing through a lens of insufficient size and/or shape, thereby allowing the IR light cone 148 to extend laterally away from the centrally located camera lens 116 without restriction from the lens 110. Similarly, on the opposing side of the LED array 112, the second LED 132, located at the left lateral edge 134 of the generally circular LED array 112 is shown emitting an IR light cone 150. The IR light cone 150 is similarly uncropped, i.e., not truncated, thereby allowing the IR light cone 150 to extend laterally away from the centrally located camera lens 116 without restriction from the lens 110. In sum, the combined uncropped light cones 148, 150 provide an IR illuminated field of view of the camera 100 that exhibits a width $W_1$ that is sufficiently large as to generate a widescreen night vision image at the image sensor 117, where $W_1$ is relative to both a distance "Z" measured from the front surface 111 of the camera 100 and the angle ALPHA at which the LEDs 128, 132 are positioned relative to a longitudinal axis of the field of view of the image sensor 117. That is to say that the value of $W_1$ will increase as the distance Z measured from the front surface 111 of the camera 110 increases, and as the angle ALPHA increases. In one exemplary embodiment, where the angle ALPHA of LEDs 128 and 132 are each 30° relative to the longitudinal axis of the field of view of the image sensor 117, and $W_1$ is measured at a distance Z of 7 meters from the front surface 111 of the camera 110, $W_1$ will have a value of approximately between 20 meters and 21 meters, and more preferably 20.5 meters and 20.7 meters.

Turning now to FIG. 4B, the generally polygonal lens 110 is shown in a cross-sectional view from above the camera 100. The first and second LEDs 128, 132 are shown behind the generally polygonal lens 110, which is received within the recess 118 located in the front surface 112 of the housing 108. The first LED 128 is shown emitting an uncropped IR light cone 148 that extends laterally, to the right of, i.e., away from, the centrally located camera lens 116 without restriction from the lens 110 of housing 108. Similarly, on the opposing side the second LED 132 is shown emitting a similarly uncropped IR light cone 150 that extends laterally, to the left of, i.e., away from, the centrally located camera lens 116 without restriction from the lens 110 or housing 108. The width $W_1$ of the combined IR illuminated field of view of the camera 100, including both IR light cones 148, 150, is again sufficiently large as to generate a widescreen night vision image at the image sensor 117.

Figure 5A:
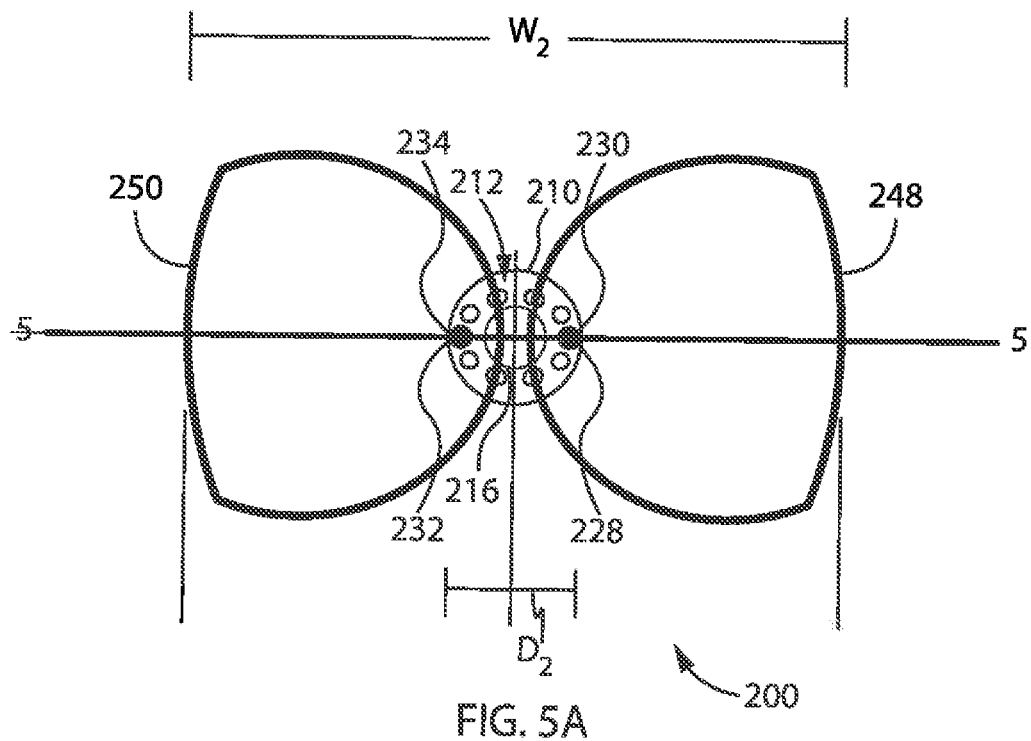
FIG. 5A is a partial front elevation view of a prior art camera including a circular lens, showing the cross sectional area of the light cones emitted from the lateral LEDs within the LED array, and appropriately labeled "PRIOR ART"
Figure 5B:
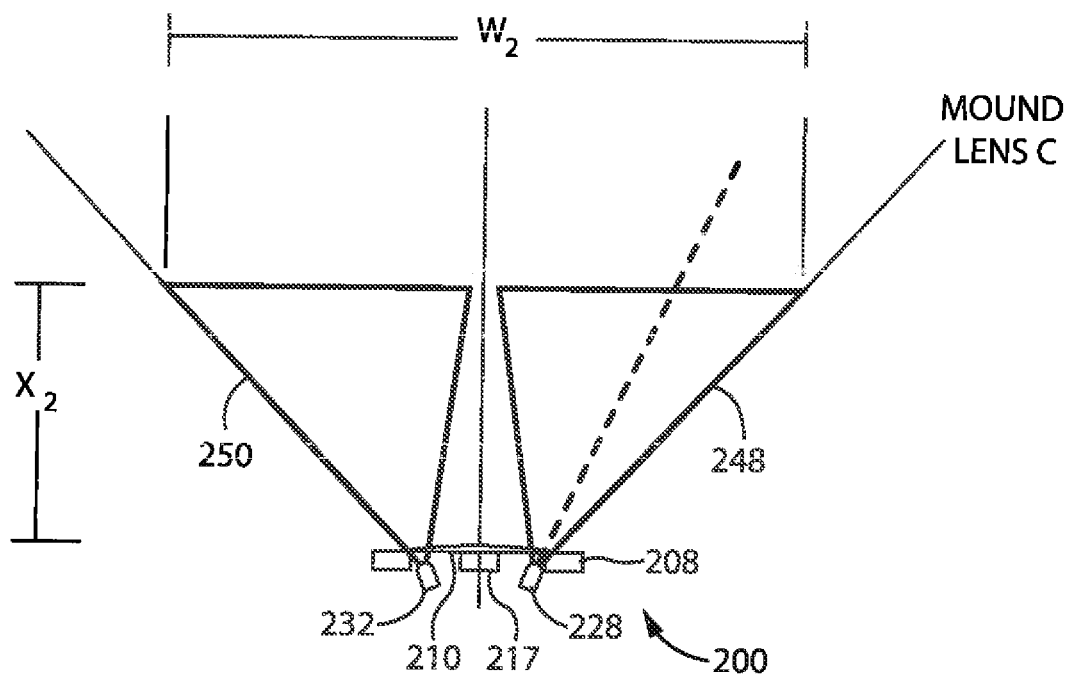
FIG. 5B is a partial cross-sectional view of the prior art camera shown in FIG. 5A, taken generally along line 5-5.

In contrast to the previously described illustration of one embodiment of the present invention shown in FIGS. 4A and 4B, FIGS. 5A and 5B show a comparative prior art camera 200 that does not include the generally polygonal lens 110 of the present invention. For the sake of comparison, like structures in the comparative prior art camera 200 are identified by like reference numbers, which have been increased by an integer of 100. Rather than including a generally polygonal lens 110 of the present invention, the comparative prior art camera 200 shown in FIGS. 5A and 5B, includes a circular lens 210 having a diameter equal in length to the diameter $D_2$ of the outer edge of the generally circulars LED array 212. For the sake of comparison the diameter of generally circular lens 210 shown in FIGS. 5A and 5B is approximately equal to the length $L_1$ of the outer edge 122 of the generally polygonal lens 110 the present invention.

Turning now to FIG. 5A, prior art camera 200 includes an LED array 212 located underneath the circular lens 210 with the centrally located camera lens 216 extending through an aperture 214 in the generally circular lens 210 of the outer edge. The first LED 228 is located at the right lateral edge 230 of the generally circular LED array 212 and is shown emitting an IR light cone 248. The IR light cone 248 is cropped, i.e., truncated, as a result of passing through generally circular lens 210 that has a diameter $D_2$ equal to the diameter $D_1$ of the outer edge of the generally circulars LED array 212. Resultantly, as shown in FIG. 5A, the distance in which the IR light cone 248 extends laterally to the right of, i.e., away from, the centrally located camera lens 216, is undesirably limited. Similarly, on the opposing side of the LED array 212, the second LED 232 located at the left lateral edge 234 of the generally circular LED array 212 is shown emitting an IR light cone 250. The IR light cone 250 is similarly cropped as a result of being restricted while passing through the generally circular lens 210 that has a diameter $D_2$ equal to the diameter $D_1$ of the outer edge of the generally circulars LED array 212. In sum, the cropped light cones 248, 250, when combined, result in providing an IR illuminated field of view of the camera 200 that exhibits a reduced width $W_2$, when both the angle ALPHA of LEDs 228 and 232 and the distance Z from front surface 211 of the camera 210 at which $W_2$ is measured, are the same as described above in conjunction with FIGS. 4A and 4B. Hence, $W_1$ of the camera 110 will have a value greater than $W_2$ of the prior art camera 210, when the relative angle ALPHA of the LEDs 228, 232 are equal to those of LEDs 128, 132, and the distances Z at which $W_1$ and $W_2$ are measured relative to the front surfaces 211, 111 are equal. The ratio of $W_1$ to $W_2$ is approximately between 1.2:1 and 1.4:1, and more preferably approximately between 1.4:1 and 1.5:1.

Accordingly, the reduced IR illuminated field of view width $W_2$ is insufficient as to allow a widescreen night vision image to be generated at the image sensor 217 of the camera 200. As similarly seen in FIG. 5B, in which the circular lens 210 of camera 200 is shown in a cross-sectional view camera 200, the width $W_2$ of the combined IR illuminated field of view of the camera 200, including both cropped IR light cones 248, 250 is again reduced, relative to the width $W_1$ of the present invention, and as such is insufficient as to allow a widescreen night vision image to be generated at the image sensor 217 of the camera 200.

Figure 6:
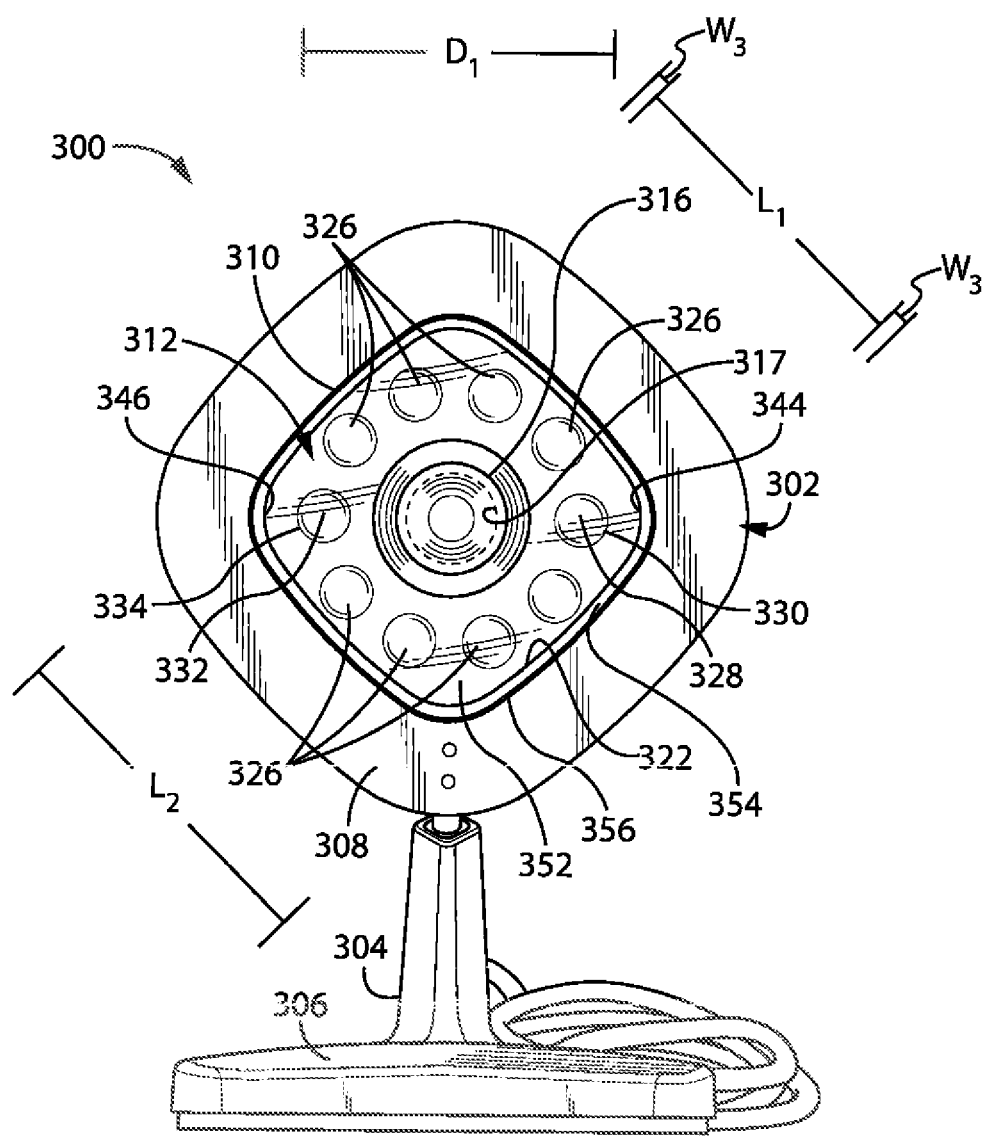
FIG. 6 is a front elevation view of an alternative embodiment of the camera of FIG. 1.

Referring now to FIG. 6, another embodiment of a camera 300 of present invention is illustrated in which, referring to the previously described first embodiment of camera 100, like structures are identified by like reference numbers that have been increased by a value of 200. In this alternative embodiment, the surface area 342 of the generally polygonal lens 310 may include both an optically functional surface area 352 and a peripheral mounting rim 354 surrounding the optically functional surface area 352. In this embodiment, optically functional surface area 352 may be defined as the area contained within the edge 322, as previously discussed, while the peripheral mounting rim 354 may define an area of the generally polygonal lens 310 that boarders and generally extends outwardly beyond the optically functional surface area 352. In this alternative embodiment, the peripheral mounting rim 354 portion of the generally polygonal lens 310 may be affixed or mounted to the housing 308 of the camera 300, such that the peripheral mounting rim 354 does not function as an optical lens, but rather provides a mounting surface for the lens 310 generally. As such, the length $L_1$ of the edge 322 of the optically functional surface area 352 of the generally polygonal lens 310 may be less than a length $L_2$ of the outer edge 356 of the peripheral mounting rim 354 of the generally polygonal lens 310, when the generally polygonal lens 310 includes a peripheral mounting rim 354. In such an alternative embodiment, length $L_1$ of the outer edge 322 of the optically functional surface area 352 may be shorter than the length $L_2$ of the outer edge 356 of the generally polygonal lens 310 by a sum of twice the width $W_3$ of the peripheral mounting rim 354.

In still another embodiment of the camera of present invention (not shown), the generally polygonal lens may be a diverging lens configured to spread the IR light cones emitted from the LEDs of the LED array throughout the field of view of the image sensor. In such an embodiment, the lens may be a biconcave of plano-concave lens. The generally polygonal lens may also include a curvature projecting outwardly and perpendicular from the outer diameter from the generally circular LED array in its corresponding embodiment of the camera.

It is contemplated that an alternative embodiment may incorporate any of the features of the previous embodiment described above.

Many other changes and modifications could be made to the invention without departing from the spirit thereof.

We claim:

1. A camera, comprising:
a camera housing
an annular LED array comprising a plurality of LEDs disposed about an image sensor, wherein the image sensor and annular LED array are located within the camera housing;
the annular LED array having an outer diameter and an outer circumference; and
a generally polygonal lens disposed at a front surface of the camera housing, covering the image sensor, and extending laterally outwardly beyond the outer circumference of the annular LED array, wherein an outer edge of the generally polygonal lens has a length equal to or less than the outer diameter of the annular LED array.

2. The camera of claim 1, wherein the generally polygonal lens is a generally equilateral polygonal lens.

3. The camera of claim 2, wherein the generally equilateral polygonal lens further comprises at least a first vertex and a second vertex disposed adjacent opposing sides of the outer diameter of the annular LED array, and wherein the first vertex and second vertex are approximately equidistant from a top edge and a bottom edge of the annular LED array, respectively.

4. The camera of claim 3, wherein the first vertex is disposed adjacent a right lateral side of the annular LED array and the second vertex is disposed adjacent a left lateral side of the annular LED array.

5. The camera of claim 4, wherein the annular LED array comprises in part a first LED and a diametrically opposed second LED; and wherein the first and second LEDs project uncropped light cones through the generally equilateral polygonal lens.

6. The camera of claim 5, wherein the first LED is disposed adjacent a tight side of the annular LED array and the second LED is disposed adjacent a left side of the annular LED array.

7. The camera of claim 6, wherein the annular LED array is a generally circular LED array.

8. The camera of claim 2, wherein the generally equilateral polygonal lens is a generally square lens.

9. The camera of claim 8, wherein the generally square lens further comprises at least a first vertex and a second vertex, and wherein the first vertex of the generally square lens is disposed adjacent a right lateral side of the annular LED array and the second vertex of the generally square lens is disposed adjacent a left lateral side of the annular LED array.

10. The camera of claim 7, wherein the generally equilateral polygonal lens is a generally square lens comprising at least a first vertex disposed adjacent the first LED and a second vertex disposed adjacent the second LED; and wherein the first and second LEDs project uncropped light cones through the generally square lens.

11. The camera of claim 2, wherein the generally equilateral polygonal lens has a curved surface projecting outwardly and perpendicular from the outer diameter from the annular LED array.

12. The camera of claim 1, wherein the outer edge of the generally polygonal lens is a first outer edge of a plurality of outer edges, and wherein the plurality of outer edges are of equal length.

13. The camera of claim 12, wherein the plurality of outer edges form a plurality of vertices of equal angle.

14. The camera of claim 1, wherein the image sensor is configured to receive an image in a widescreen format.

15. A camera, comprising:
a generally circular LED array comprising a plurality of LEDs disposed about an image sensor configured to receive an image in a widescreen format;
the generally circular LED array having an outer diameter;
a generally square lens covering the generally circular LED array, the generally square lens comprising outer edges having a length equal to or less than the outer diameter of the generally circular LED array; and
wherein the generally square lens further comprises a first vertex disposed adjacent a right lateral edge of the generally circular LED array and a second vertex disposed adjacent a left lateral edge of the generally circular LED array.

16. The camera of claim 15, wherein the generally circular LED array comprises a first LED disposed adjacent a right lateral edge of the generally circular LED array and a second LED disposed adjacent a left lateral edge of the generally circular LED array; and wherein the first and second LEDs project uncropped light cones through the generally square lens.

17. The camera of claim 15, wherein a surface area of the generally square lens extends laterally beyond a location of the first and second LEDs, respectively.

18. A method of using an LED array camera configured to receive widescreen format images, comprising the steps of:
projecting uncropped light cones from a plurality of LEDs arranged in an annular LED array disposed about an image sensor, wherein the image sensor and annular LED array are located within a camera housing, and wherein the uncropped light cones are projected through a generally polygonal lens disposed at a front surface of the camera housing coving the image sensor and extending outwardly beyond an outer circumference of the annular LED array;
illuminating a field of view of the image sensor with the uncropped light cones; and
receiving an illuminated image at the image sensor.

19. The method of claim 18, further comprising the steps of
illuminating a right edge of the field of view of the image sensor with the uncropped light cone projected from a first LED, wherein the uncropped light cone of the first LED is projected through the generally polygonal lens at a first vertex of the lens; and
illuminating a left edge of the field of view of the image sensor with the uncropped light cone projected from a second LED, wherein the uncropped light cone of the second LED is projected through the generally polygonal lens at a second vertex of the lens, opposite the first vertex of the lens.

20. The method of claim 18, wherein the illuminated image received at the image sensor is received in a widescreen format.

* * * * *